T. MIDGLEY.
WHEEL TIRE.
APPLICATION FILED MAY 1, 1907.
962,778. Patented June 28, 1910.
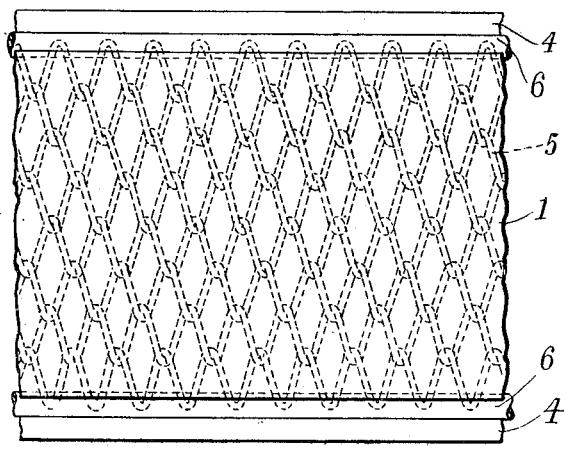
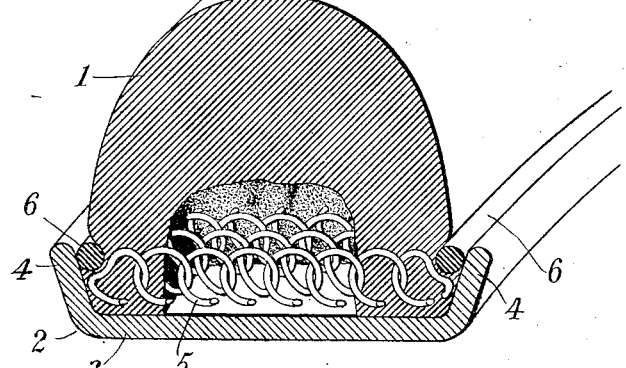
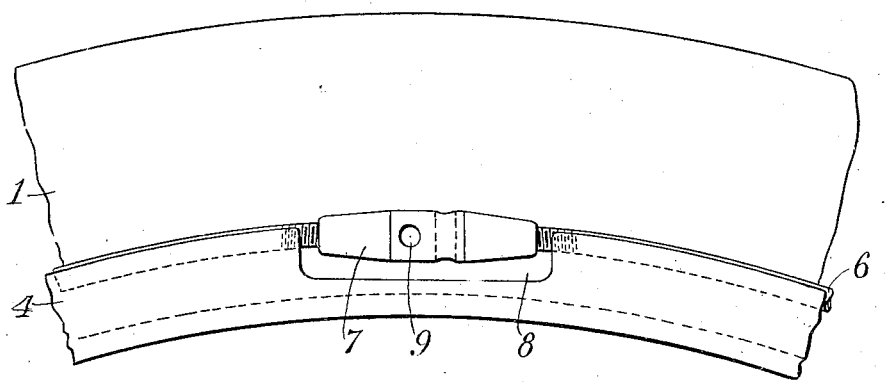
Witnesses:
Raphaël Netter
Baxter Morton
Thomas Midgley, Inventor
By his Attorney Ernest H. Hopkinson

UNITED STATES PATENT OFFICE.

THOMAS MIDGLEY, OF COLUMBUS, OHIO, ASSIGNOR TO THE HARTFORD RUBBER WORKS COMPANY, A CORPORATION OF CONNECTICUT.

WHEEL-TIRE.

962,778.

Specification of Letters Patent. Patented June 28, 1910.

Application filed May 1, 1907. Serial No. 371,304.

*To all whom it may concern:*

Be it known that I, THOMAS MIDGLEY, a citizen of the United States, residing in the city of Columbus, county of Franklin, and State of Ohio, have invented a new and useful Improvement in Wheel-Tires, of which the following is a specification.

This invention relates to wheel tires and more particularly to wheel tires comprising a body of resilient material, such as a vulcanized india rubber compound.

The principal object of the invention is the provision of a tire comprising a resilient body, which may be of the solid, cushion, or pneumatic type, and provided with securing devices of simple and inexpensive design by means of which the tire may be readily and effectively secured upon a wheel rim presenting a channel with fixed sides.

Other objects of the invention will appear in the course of the following description, in which reference is had to the accompanying drawings, corresponding parts in the several views being indicated by similar characters of reference.

In the drawings: Figure 1 is a plan view of a section of tire and rim, the structures embedded in the base of the tire being indicated in dotted lines; Fig. 2 is a perspective sectional view of a portion of the tire and rim, some of the resilient material being removed from the base of the tire to disclose the embedded stiffening structure; Fig. 3 is a fragmentary view in side elevation of the wheel rim and tire.

For simplicity of illustration, the tire shown is of the solid type and comprises a body of rubber compound 1 which is seated in a rim 2 comprising a flat base portion 3 and side portions 4, which are preferably inclined laterally to a slight extent, as shown. In the base of the tire is embedded a structure consisting of a plurality of coils 5 of metal wire, which are preferably interlaced to facilitate handling. As shown in the drawings, the axes of the coils are disposed circumferentially of the wheel and the coils adjacent to the side portions of the tire base are distorted from their normal form by pressure, so that the upper portion of each whirl of these coils presents a concave curvature instead of the normal convex curvature. The tire is secured in the channel presented by the rim by means of side wires 6 which rest in seats formed to receive them in the sides of the tire, each wire lying over the concavity presented by the whirls of the adjacent coil of wire embedded in the base of the tire. The side wires 6 may be secured in any suitable manner, but they are preferably provided with turn-buckles 7 in threaded engagement with the ends of the wires, the threads on the wires and in the turn-buckles being oppositely disposed, so that rotation of the turn-buckles in one direction will contract the side wires upon the tire base and rotation in the opposite direction will expand the side wires so as to permit them to slip readily over the side portions of the rim. The side portions of the rim are preferably cut away, as shown at 8, to facilitate the operation of the turn-buckles by means of a short lever having an end adapted to enter the apertures 9 in the turn-buckle.

The application of the tire to the rim may be accomplished in various ways. If the tire is formed endless, or is cut from a suitable length of stock and the ends joined before application to the wheel, the tire should be of such circumferential length that it must be sprung over the rim. This may be easily done, as the embedded coils of wire in the base of the tire do not impair its circumferential extensibility. The tire having been sprung into the channel of the rim, the side wires are seated upon the base of the tire in the seats provided to receive them and are then contracted by means of the turn-buckles until they bind tightly upon their seats. The removal of the tire from the rim is accomplished by reversing the operations above described. The side wires having been expanded by means of the turn-buckles, the tire can be pried out of the rim channel without great difficulty by means of suitable tools.

From the foregoing description and the drawings referred to therein, it will be seen that the tire is characterized by a base which is circumferentially extensible but is adapted to present solid seats upon which the side wires can be securely seated so as to hold the tire effectively upon the rim.

While I have shown the side wires as connected by means of a device which can be operated without difficulty by means of a simple implement which can be easily carried on the road, it is to be understood that the side wires may be applied in the factory when the tire is fitted to the wheel rim and may be secured by brazing the ends or by other permanent fastenings. Turn-buckles or their equivalents are preferable, however, as their use permits the renewal of tires upon wheels without shipping the wheels to the factory.

Having thus described my invention, what I claim as new and desire to secure by Letters Patent is:

The combination with a wheel rim of a tire comprising a resilient body presenting lateral seats for binding wires and having embedded in its base and extending unbrokenly substantially from side to side thereof a plurality of metal wire coils, the coils adjacent to the sides of the base being concaved to present seats for said binding wires, and metal binding wires adapted to engage the seats on said tire body to secure the tire to the rim.

In testimony whereof, I have signed my name in the presence of two witnesses.

THOMAS MIDGLEY.

Witnesses:
  BAXTER MORTON,
  WM. BRADFORD.